(12) United States Patent
Sherman et al.

(10) Patent No.: US 8,994,230 B2
(45) Date of Patent: Mar. 31, 2015

(54) BI-DIRECTIONAL POWER CONTROL

(75) Inventors: Itay Sherman, Hod Hasharon (IL); Eran Miller, Givataim (IL)

(73) Assignee: Google Inc., Mountain View, CA (US)

( * ) Notice: Subject to any disclaimer, the term of this patent is extended or adjusted under 35 U.S.C. 154(b) by 792 days.

(21) Appl. No.: 13/233,618

(22) Filed: Sep. 15, 2011

(65) Prior Publication Data
US 2012/0062043 A1 Mar. 15, 2012

Related U.S. Application Data

(63) Continuation of application No. 12/263,560, filed on Nov. 3, 2008, now Pat. No. 8,032,259.

(51) Int. Cl.
| | | |
|---|---|---|
| H01H 47/00 | (2006.01) | |
| H01H 35/00 | (2006.01) | |
| H01H 83/18 | (2006.01) | |
| H02H 3/02 | (2006.01) | |
| H02H 3/42 | (2006.01) | |
| H04M 15/00 | (2006.01) | |
| G06Q 30/06 | (2012.01) | |

(52) U.S. Cl.
CPC ............... *H04M 15/00* (2013.01); *G06Q 30/06* (2013.01)
USPC .................. 307/126; 307/64; 307/66; 307/82; 307/39; 307/125; 709/223; 709/217; 709/206; 710/29; 710/301; 361/737

(58) Field of Classification Search
USPC ........ 307/126, 39, 80, 82; 709/223, 206, 217; 361/737; 710/301
See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |
| 6,201,867 B1 | 3/2001 | Koike |

(Continued)

FOREIGN PATENT DOCUMENTS

| | | |
|---|---|---|
| EP | 1871075 A1 | 12/2007 |
| WO | 9421058 A1 | 9/1994 |

(Continued)

*Primary Examiner* — Rexford Barnie
*Assistant Examiner* — Jagdeep Dhillon
(74) *Attorney, Agent, or Firm* — Soquel Group LLC

(57) ABSTRACT

An electrical circuit for bi-directional power control between two devices, including a mobile communication card, an electronic device that connects to the communication card, the electronic device being either (i) a host device that operates independently of the communication card and also interoperates with the communication card, or (ii) a jacket for the communication card, wherein the jacket is a passive device that does not operate independently of the communication card, and circuitry connecting the mobile communication card with the electronic device, including a device on/off button operative to power the electronic device on and off, and a switch, wherein the circuitry uses a single connection line connecting the communication card, the electronic device, the device on/off button, and the switch, to enable the electronic device to automatically power the communication card on and off using the switch, in response to the electronic device being respectively powered on and off.

10 Claims, 4 Drawing Sheets

(56) References Cited

U.S. PATENT DOCUMENTS

| | | |
|---|---|---|
| 6,243,578 B1 | 6/2001 | Koike |
| 6,477,357 B1 | 11/2002 | Cook |
| 6,516,202 B1 | 2/2003 | Hawkins et al. |
| 6,640,113 B1 | 10/2003 | Shim et al. |
| 6,690,947 B1 | 2/2004 | Tom |
| 6,798,647 B2 | 9/2004 | Dickie |
| 6,898,283 B2 | 5/2005 | Wycherley et al. |
| 6,907,264 B1 | 6/2005 | Sterkel |
| 6,961,237 B2 | 11/2005 | Dickie |
| 6,999,792 B2 | 2/2006 | Warren |
| 7,085,542 B2 | 8/2006 | Dietrich et al. |
| 7,194,285 B2 | 3/2007 | Tom |
| 7,266,391 B2 | 9/2007 | Warren |
| 7,477,919 B2 | 1/2009 | Warren |
| 7,515,937 B2 | 4/2009 | Lee |
| 7,872,872 B2 * | 1/2011 | Doczy et al. .................. 361/737 |
| 2002/0090980 A1 | 7/2002 | Wilcox et al. |
| 2002/0105234 A1 * | 8/2002 | Ruat et al. .................... 307/139 |
| 2002/0151327 A1 | 10/2002 | Levitt |
| 2004/0233930 A1 | 11/2004 | Colby, Jr. |
| 2004/0268005 A1 | 12/2004 | Dickie |
| 2005/0159184 A1 | 7/2005 | Kerner et al. |
| 2005/0202859 A1 | 9/2005 | Johnson et al. |
| 2006/0003804 A1 | 1/2006 | Liu |
| 2006/0105722 A1 | 5/2006 | Kumar |
| 2006/0190321 A1 | 8/2006 | Martins Nicho et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0162582 A1 * | 7/2007 | Belali et al. ................... 709/223 |
| 2007/0288583 A1 | 12/2007 | Rensin et al. |
| 2008/0009325 A1 | 1/2008 | Zinn et al. |
| 2008/0040354 A1 | 2/2008 | Ray et al. |
| 2008/0140886 A1 | 6/2008 | Izutsu |
| 2008/0307142 A1 * | 12/2008 | Sherman et al. .............. 710/301 |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

* cited by examiner

BI-DIRECTIONAL POWER CONTROL

PRIORITY REFERENCE TO RELATED APPLICATIONS

This application is a continuation of U.S. application Ser. No. 12/263,560, entitled BI-DIRECTIONAL POWER CONTROL, filed on Nov. 3, 2008 by inventors Itay Sherman and Eran Miller, which claims benefit of PCT Application No. PCT/IL2008/000164, entitled MODULAR WIRELESS COMMUNICATOR, filed on Feb. 6, 2008 by inventors Dov Moran, Itay Sherman, Eyal Bychkov, Itay Cohen, Yaron Segalov, Tamir Demri, Eran Miller, Uri Ron, Tal Engelstein, Hagay Katz and Hagit Perry.

FIELD OF THE INVENTION

The field of the present invention is power management and control for electronic devices.

BACKGROUND OF THE INVENTION

Today's mobile devices are designed to optimize their power consumption, and specifically to avoid power loss during standby or shutdown. Generally, silicon integrated circuits (ICs) have significant current leakage, which is consumed when they are connected to a power source, even if they are not operational. To mitigate the leakage, mobile devices include a power management IC that controls the power to other ICs in the device, and cuts off power to the other ICs when the device is in standby or shutdown mode. Detection of a wakeup event by the power management IC, serves to power the device on or off. A wakeup event is either a button press and release, or a switch being closed and released thereby changing its logical level from 1 to 0 and back to 1.

SUMMARY OF THE DESCRIPTION

Aspects of the present invention relate to a mobile communication card which connects to another electronic device, where the other electronic device may be a host device that interoperates with the communication card, or a jacket for the communication card, the jacket being a passive device that does not operate independently of the communication card. A single line of a connector between the communication card and the jacket/host suffices to enable the communication card to turn the jacket/host on and off, and to enable the jacket/host to turn the communication card on and off. The same line is used for the communication card to generate wakeup events to power the jacket/host on or off, and for the jacket/host to generate wakeup events to power the communication card on or off. A wakeup event is either a button press and release, or a switch being closed and released thereby changing its logical level from 1 to 0 and back to 1.

There is thus provided in accordance with an embodiment of the present invention an electrical circuit for bi-directional power control between two devices, including a first battery-operated device, including a first battery for providing a source of power to the first battery-operated device, a first power management subsystem connected to the first battery, to power on and power off components of the first battery-operated device in response to a first wakeup event, $WE_1$, and a first on/off button for generating $WE_1$, a second battery-operated device, including a second battery for providing a source of power to the second battery-operated device, a second power management subsystem connected to the second battery, to power on and power off components of the second battery-operated device in response to a second wakeup event $WE_2$, a second on/off button for generating $WE_2$, and a switch for generating $WE_1$ simultaneously when the second on/off button generates $WE_2$, and circuitry including a single connection inter-connecting the first power management subsystem, the first on/off button, the second power management subsystem, the second on/off button, and the switch for generating $WE_1$.

There is further provided in accordance with an embodiment of the present invention an electrical circuit for bi-directional power control between two devices, including a mobile communication card, an electronic device that connects to the communication card, the electronic device being either (i) a host device that operates independently of the communication card and also interoperates with the communication card, or (ii) a jacket for the communication card, wherein the jacket is a passive device that does not operate independently of the communication card, and circuitry connecting the mobile communication card with the electronic device, including a card on/off button for the mobile communication card, a device on/off button for the electronic device, and a switch, wherein the circuitry uses a single connection line connecting the communication card, the electronic device, the card on/off button, the device on/off button, and the switch, to enable (i) the card on/off button to power the communication card on and off, (ii) the device on/off button to power the electronic device on and off, and (iii) the electronic device to simultaneously power the communication card on and off via the switch when the electronic device is powered on and off by the device on/off button.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to power management and control between two connected electronic devices. Using special circuitry, each device is able to turn the other device on and off, by generating wakeup events at one device to power the other device on or off, over a single line of a connector.

Figure 1A:
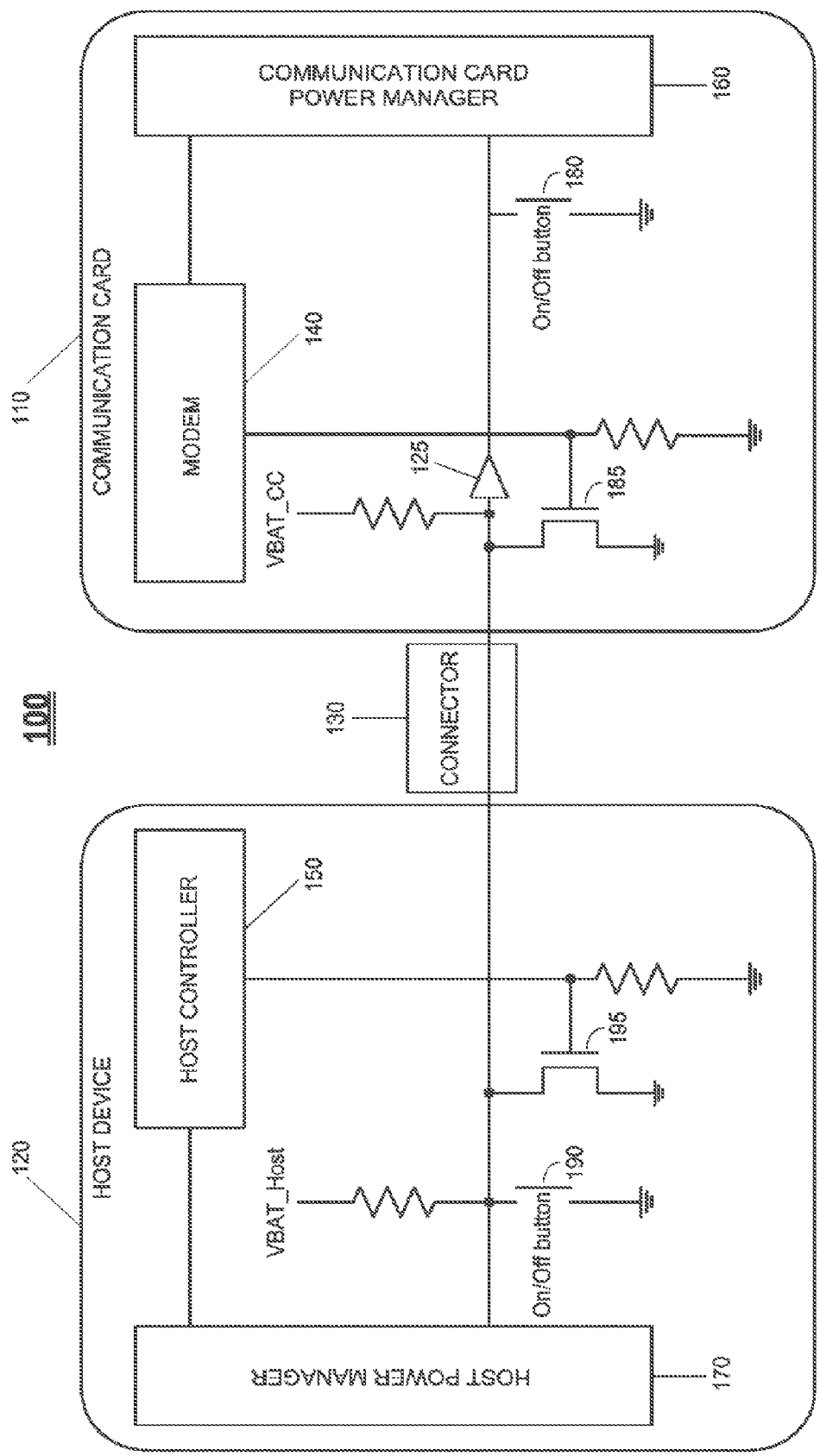
FIGS. 1A and 1B are simplified diagrams of circuits that provide bi-directional power control, in accordance with an embodiment of the present invention.
Figure 1B:
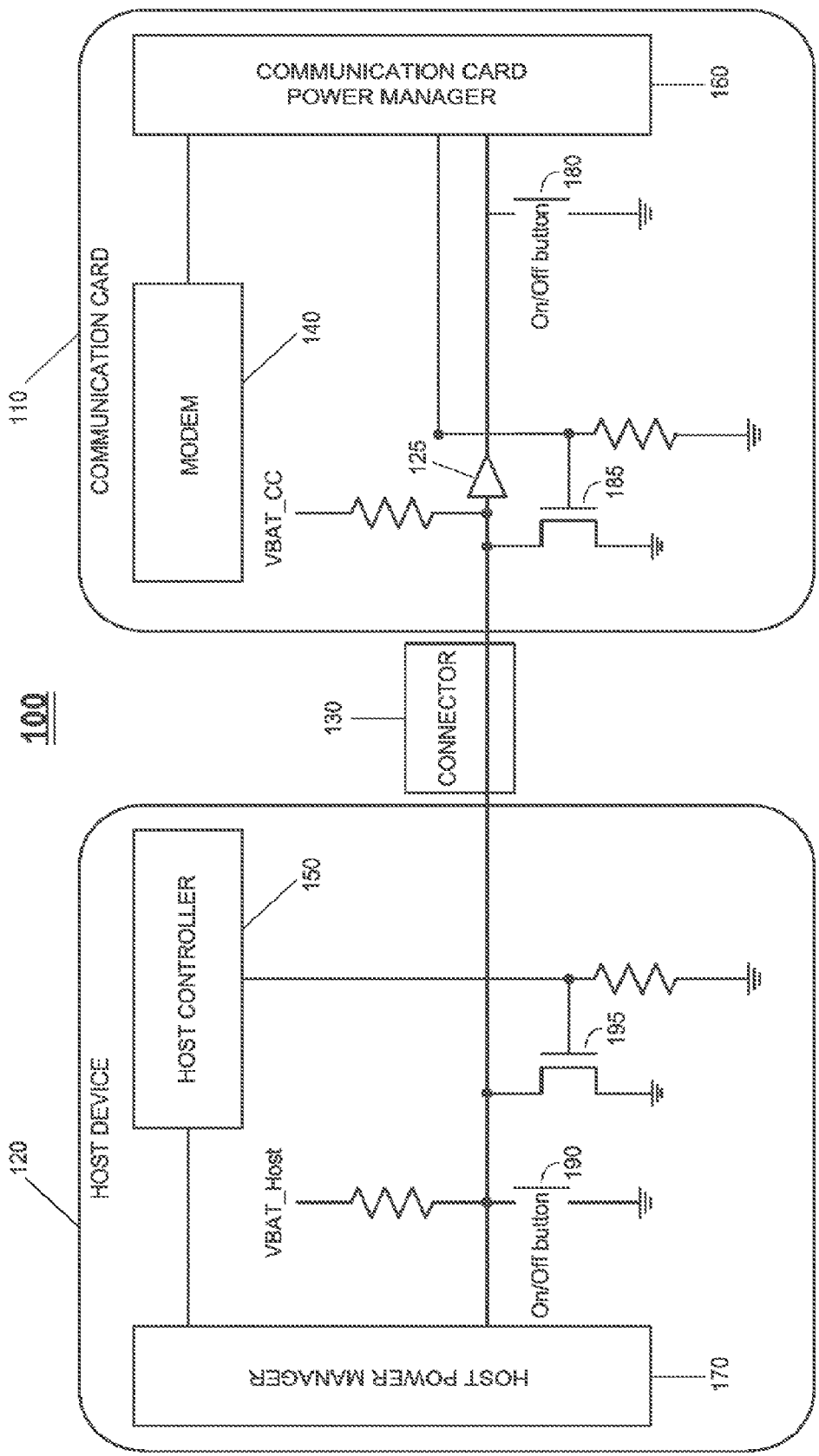
Figure 2:
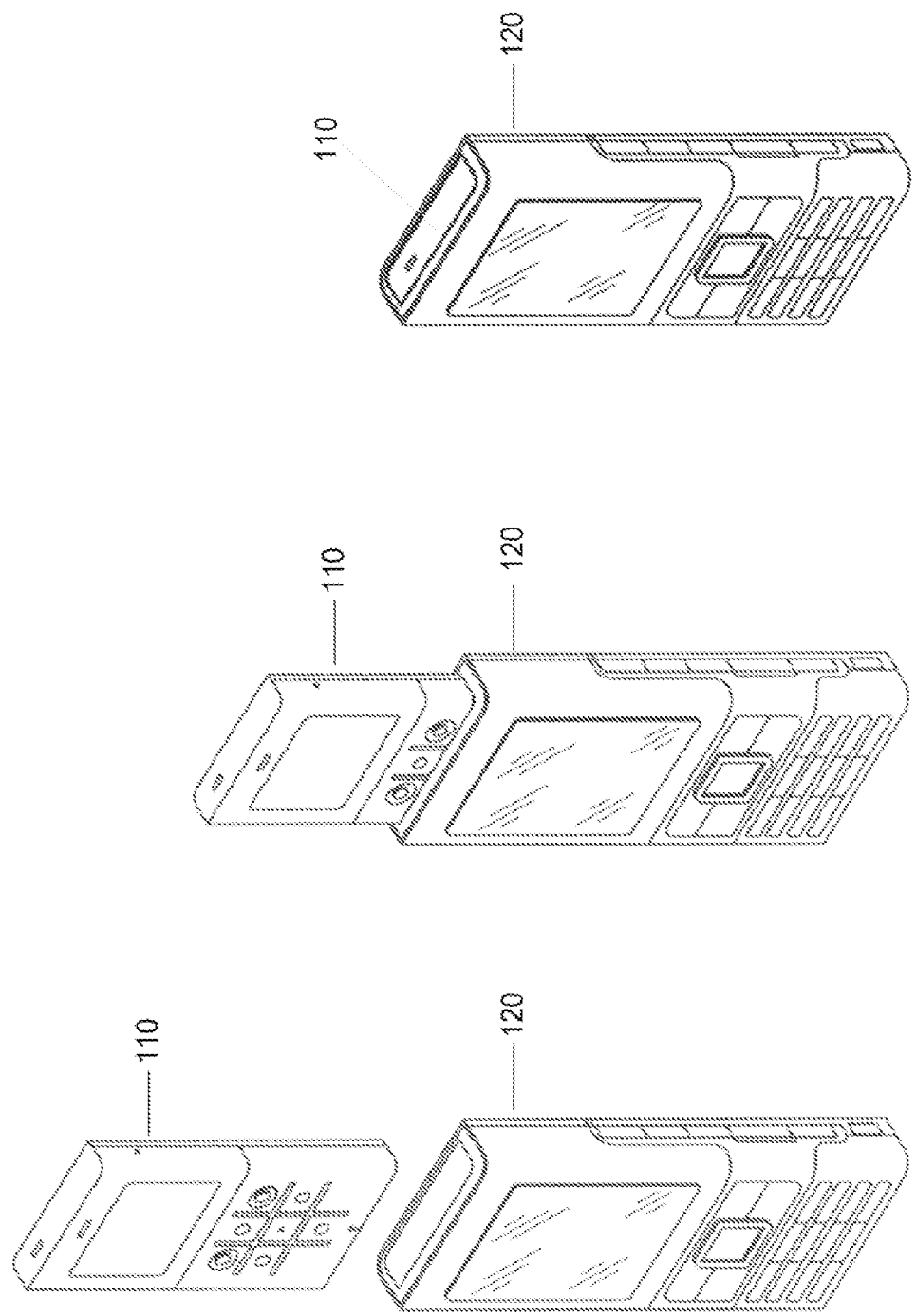
FIG. 2 is an illustration of communication card being inserted into a jacket, in accordance with an embodiment of the present invention.

Reference is now made to FIGS. 1A and 1B, which are simplified diagrams of circuits 100 that provide bi-directional power control, in accordance with an embodiment of the present invention. Shown in FIGS. 1A and 1B is a communication card 110 connected to a device 120 via a dedicated connector 130. Communication card 110 is a mobile communication device that includes a modem 140.

Communication card 110 attaches to device 120 via connector 130.

Device 120 may be a passive device, referred to as a "jacket", which does not operate independently of communication card 110. In this regard, reference is now made to FIG.

2, which is an illustration of communication card 110 being inserted into a jacket 120, in accordance with an embodiment of the present invention.

Figure 3:
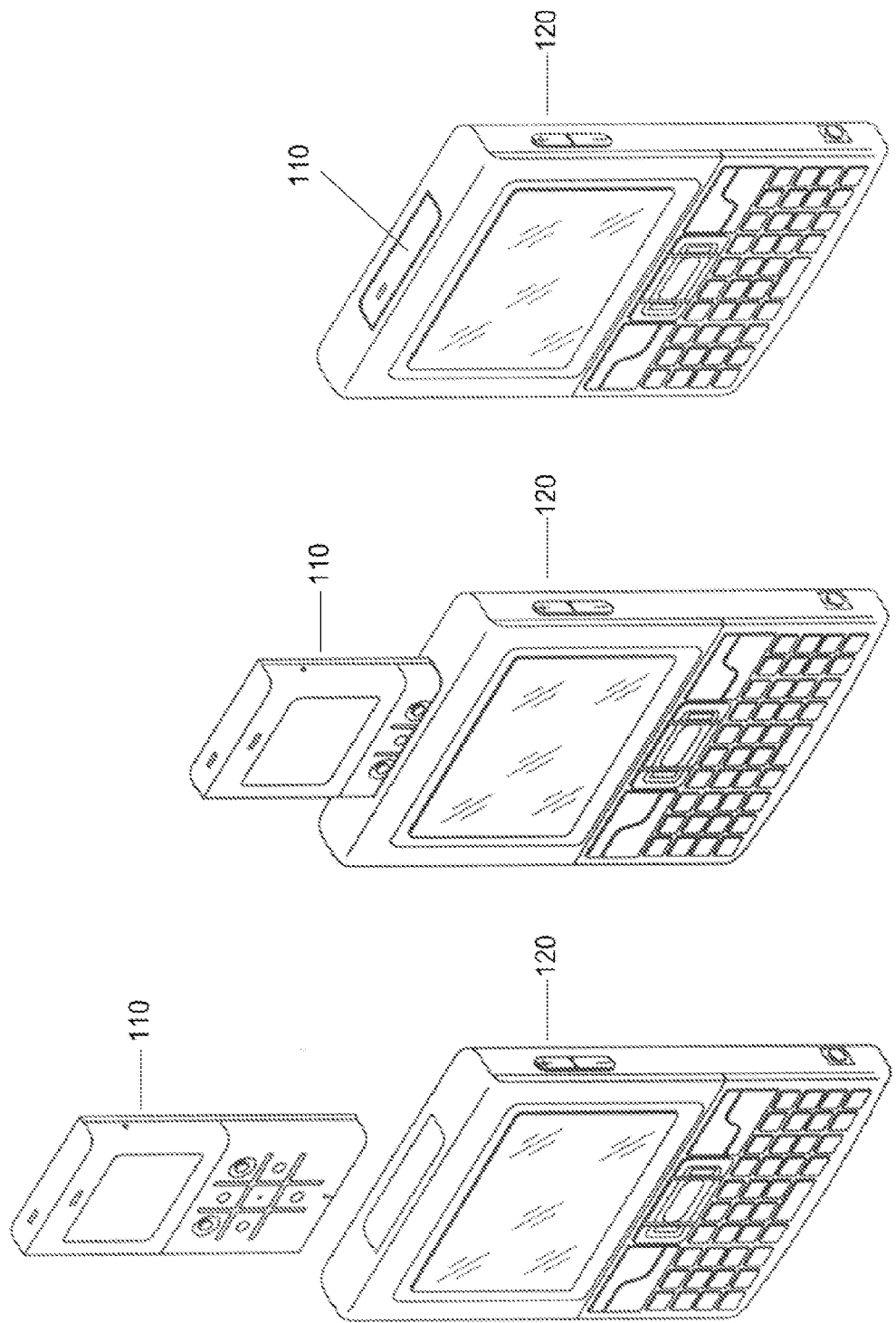
FIG. 3 is an illustration of communication card being inserted into a host, in accordance with an embodiment of the present invention.

Device 120 may alternatively be an active device, referred to as a "host", which has its own controller 150 and can operate independently of communication card 110. In this regard, reference is now made to FIG. 3, which is an illustration of communication card 110 being inserted into a host 120, in accordance with an embodiment of the present invention. The devices 120 shown in FIGS. 1A and 1B are host devices, but it will be appreciated by those skilled in the art that the circuits of FIGS. 1A and 1B also apply to jacket devices.

In an embodiment of the present invention, communication card 110 and host 120 are battery-operated devices, and have their own batteries for power. Power sources for communication card 110 and host 120 are designated by VBAT_CC and VBAT_Host, respectively, in circuit 100. Typical voltages for the batteries range from 4.2V for a fully charged battery to 2.8V-3.2V for a low battery, depending on system characteristics. Circuit 100 uses an optional voltage level shifter 125 to control the potential voltage gap between power sources VBAT_CC and VBAT_Host. One of the device batteries may be fully charged at 4.2V, for example, and the other may be at the low range of 3.2V.

Voltage level shifter 125 is powered from VBAT_CC, and its output level is based on VBAT_CC. Specifically, logical bit 1 corresponds to an output of VBAT_CC, and logical bit 0 corresponds to an output level of zero voltage. Voltage level shifter 125 also manages I/O levels of communication card 110, which may differ from the level VBAT_CC.

Circuit 100 includes grounds to protect the I/O units of the two devices from exposure to a high supply voltage, and to protect the devices' power sources from being shorted to one another.

Communication card 110 and host 120 are assumed to have respective power management ICs 160 and 170 that power them on and off when wakeup events occur. Additionally, a single line of connector 130 between communication card 110 and host 120 enables each device to generate wakeup events to power the other device on and off.

Communication card 110 and host 120 may be powered on and off independently; i.e., communication card 110 is able to be turned on when host 120 is turned on or off, and host 120 is able to be turned on when communication card 110 is turned on or off. Moreover, circuit 100 of FIG. 1 enables communication card 110, when it is turned on, to turn host 120 on and off; and enables host 120, when it is turned on, to turn communication card 110 on and off.

According to an embodiment of the present invention, host 120 includes an internal watchdog timer, which is used to turn on communication card 110 after a predetermined period of time.

Circuit 100 includes two on/off buttons, 180 and 190, and two on/off switches, 185 and 195, which cause each of communication card 110 and host 120 to power the other on or off. Buttons 180 and 190 are physical buttons that can be activated by a user.

Switches 185 and 195 are electronic switches that are inaccessible to the user. Instead, as shown in FIG. 1A, switches 185 and 195 are controlled by modem 140 and host controller 150, respectively. Alternatively, as shown in FIG. 1B, switch 185 may be controlled by communication power manager 160, where power manager 160 receives its commands from modem 140.

Switch 195 is generally present on host devices 120 and not on jacket devices, since host devices operate in standalone mode independently of communication card 110, whereas jacket devices do not operate in standalone mode.

Circuit 100 provides simultaneous and non-simultaneous power on/off control. Use of switch 185 to turn host 120 on or off, does not affect regular operation of communication card 110 and, vice versa, use of switch 195 to turn communication card 110 on or off, does not affect regular operation of host 120.

Specifically, when operating alone, communication card 110 is turned on and off by button 180. When button 180 is pressed to turn on communication card 110, a wakeup event is detected in its power management system 160. When communication card 110 is attached to host 120, button 180 is generally physically inaccessible, and communication card 110 can only be turned on simultaneously with host 120, via switch 185 using the internal watchdog timer, button 190 or switch 195.

Similarly, when operating alone, host 120 is turned on and off by button 190. When button 190 is pressed to turn on host 120, a wakeup event is detected in its power management system 170. When communication card 110 is attached to host 120, host 120 can be turned on asynchronously by button 190, and can also be turned on synchronously with communication card 110, via switch 195.

If device 120 is a jacket device, instead of a host device, communication card 110 is turned on and off via switch 195 on jacket 120, which generates a wakeup event for power management system 160.

Power off events are generally reported to modem 140 and to host controller 150 before each respective device is turned off. In an embodiment of the present invention, when button 190 is used to turn off one or both of communication card 110 and host 120, button 190 must be pressed for a long press. The time duration of a press of button 190 is calculated in software, by host controller 150, generally via telemetries that controller 150 receives from host power manager 170.

Similarly, when communication card 110 is not attached to host 120, button 180 is accessible, and may be used to turn communication card 110 on and off. The time duration of a press of button 180 is calculated in software, by card modem 140, generally via telemetries that modem 140 receives from host power manager 160.

TABLE I summarizes an embodiment of simultaneous and non-simultaneous power on/off control enabled by button 190, and switches 185 and 195, when communication card 110 is attached to host 120.

TABLE I

Power on/off control when communication card 110 is attached to host 120

| Before wakeup/ shutdown event | | | After wakeup/ shutdown event | |
| --- | --- | --- | --- | --- |
| Host (120) State | Communication card (110) state | Wakeup/ shutdown event | Host (120) State | Communication card (110) state |
| Off | Off | Button 190 pushed | On | On |
| On | Off | Switch 195 activated | On | On |
| | | Button 190 pushed | Off | Off |
| Off | On | Button 190 pushed | On | On |
| On | On | Switch 195 activated | On | Off |
| | | Button 190 pushed | Off | Off |

TABLE I indicates that when switch 195 is activated to turn off communication card 110, host device 120 remains on. In such case host device 120 turns itself off in a different manner, as appropriate, not using switch 195.

Circuit 100 uses voltage level shifter 125 to manage the potential voltage gap between I/Os of the two devices.

An advantage of circuit 100 is that it uses a single line of a connector between communication card 110 and jacket/host 120, for carrying wakeup signals.

In reading the above description, persons skilled in the art will realize that there are many apparent variations that can be applied to the circuit described. In particular, it will be appreciated that some power management systems have two input signals for waking up a device. In such case, the on/off button of a device may be connected to one of its power management inputs, with the other power management input being used for a remote wakeup signal coming from another device.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A communication card having an on state and an off state and electrically connectable to an electronic device, the communication card comprising:
   a battery;
   a modem configured to be powered by at least one of said battery and an external source of power;
   an on/off button;
   a connector via which the communication card electrically connects to an electronic device;
   a voltage level shifter to shift voltage in accordance with a voltage difference between said battery and a battery of the electronic device; and
   a power manager configured to:
      detect a first wakeup event when the communication card is in the off state and when said on/off button is pressed to turn on the communication card;
      in response to the first wakeup event, cause power to be provided to said modem;
      detect a second wakeup event when the communication card is in the off state, the second wakeup event according to a wakeup signal received over said connector from the electronic device;
      in response to the second wakeup event, cause power to be provided to said modem; and
      automatically cause power to be provided to said modem after lapse of a predetermined period of time during which the communication card is connected to the electronic device.

2. The communication card of claim 1 further comprising an internal switch for generating a wakeup event to power on the electronic device, the wakeup event being transmitted over said connector to the electronic device.

3. The communication card of claim 1 wherein said on/off button is concealed by the electronic device when the communication card is electrically connected thereto.

4. The communication card of claim 1 wherein said modem is further configured to:
   detect a sleep event when the communication card is in the on state and when said on/off button is pressed to turn off the communication card;
   in response to the sleep event, determine a time duration of the button press; and
   instruct said power manager to stop causing power to be provided to said modem when the time duration of the press exceeds a designated threshold.

5. The communication card of claim 1 wherein said modem is further configured to:
   detect a sleep event when the communication card is in the on state, the sleep event according to a sleep signal received over said connector from the electronic device; and
   in response to the sleep event, instruct said power manager to stop causing power to be provided to said modem.

6. An electronic device having an on state and an off state and electrically connectable to a communication card, the electronic device comprising:
   a battery;
   a controller configured to be powered by at least one of said battery and an external source of power;
   an on/off button;
   a connector via which the electronic device electrically connects to a communication card;
   a voltage level shifter to shift voltage in accordance with a voltage difference between said battery and a battery of the communication card; and
   a power manager configured to:
      detect a first wakeup event when the electronic device is in the off state and when said on/off button is pressed to turn on the electronic device;
      in response to the first wakeup event, cause power to be provided to said controller;
      detect a second wakeup event when the electronic device is in the off state, the second wakeup event according to a wakeup signal received over said connector from the communication card;
      in response to the second wakeup event, cause power to be provided to said controller; and
      automatically generate a wakeup event to power on the communication card, after lapse of a predetermined period of time during which the communication card is electrically connected to the electronic device while the electronic device is in the on state.

7. The electronic device of claim 6 wherein the communication card has an on state and an off state, the electronic device further comprising an internal switch for generating a wakeup event to power on the communication card, the wakeup event being transmitted over said connector to the communication card.

8. The electronic device of claim 7 further comprising an internal timer to monitor the predetermined period of time.

9. The electronic device of claim 6 wherein said controller is further configured to:
   detect a sleep event when the electronic device is in the on state and when said on/off button is pressed to turn off the electronic device;
   in response to the sleep event, determine a time duration of the button press; and
   instruct said power manager to stop causing power to be provided to said controller when the time duration of the press exceeds a designated threshold.

10. The electronic device of claim 6 wherein said controller is further configured to:

detect a sleep event when the electronic device is in the on state, the sleep event according to a sleep signal received over said connector from the communication card; and in response to the sleep event, instruct said power manager to stop causing power to be provided to said controller.

* * * * *